(12) United States Patent
Kawakami

(10) Patent No.: US 12,671,776 B2
(45) Date of Patent: Jun. 30, 2026

(54) INFORMATION PROCESSING APPARATUS, INFORMATION PROCESSING SYSTEM, NON-TRANSITORY COMPUTER READABLE MEDIUM, AND METHOD FOR PROCESSING INFORMATION

(71) Applicant: FUJIFILM Business Innovation Corp., Tokyo (JP)

(72) Inventor: Shohei Kawakami, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/181,720

(22) Filed: Mar. 10, 2023

(65) Prior Publication Data

US 2024/0089393 A1 Mar. 14, 2024

(30) Foreign Application Priority Data

Sep. 9, 2022 (JP) ................................. 2022-143655

(51) Int. Cl.
*H04N 1/34* (2006.01)
*H04N 1/00* (2006.01)
(52) U.S. Cl.
CPC ........... *H04N 1/34* (2013.01); *H04N 1/00477* (2013.01)
(58) Field of Classification Search
CPC ................................................. H04N 1/00477
See application file for complete search history.

(56) References Cited

U.S. PATENT DOCUMENTS 8,125,667 B2 * 2/2012 Levy ...................... G06Q 30/04
358/1.14
2005/0264844 A1 * 12/2005 Fujitani .............. H04N 1/00143
358/1.15

FOREIGN PATENT DOCUMENTS

JP 6536832 B2 7/2019

OTHER PUBLICATIONS

NPL: Results Publication Date Range: Apr. 28, 1981 to Mar. 22, 2024.*
NPL: InnovationQ+ by IP.com and IEEE: Results Publication Date Range: Apr. 28, 1981 to Mar. 22, 2024.*

* cited by examiner

*Primary Examiner* — Quang N Vo
(74) *Attorney, Agent, or Firm* — Oliff PLC

(57) ABSTRACT

An information processing apparatus includes a processor configured to: receive an operation relating to payment of a deposit and obtain payment information, which is information regarding the payment of the deposit, from a transaction apparatus connected to the information processing apparatus over a network; receive the payment of the deposit corresponding to the payment information; add the deposit to a balance; receive execution of at least one job in consideration of the balance; and output, to the transaction apparatus, transaction information based on a cumulative charge, which is a sum of a charge for the at least one job.

16 Claims, 8 Drawing Sheets

| ID | PAYEE NAME | PAYER NAME | AMOUNT | TRANSACTION STATUS |
|---|---|---|---|---|
| 1111 | | A A A | 400 YEN | TRANSACTION COMPLETE |
| 1234 | Z Z Z | A A A | 400 YEN | TRANSACTION COMPLETE |
| 1256 | | B B B | 2,000 YEN | PROVISIONAL TRANSACTION |
| 1345 | | - | 500 YEN | DEPOSITING REQUESTED |
| ⋮ | ⋮ | ⋮ | ⋮ | ⋮ |

INFORMATION PROCESSING APPARATUS, INFORMATION PROCESSING SYSTEM, NON-TRANSITORY COMPUTER READABLE MEDIUM, AND METHOD FOR PROCESSING INFORMATION

CROSS-REFERENCE TO RELATED APPLICATIONS

This application is based on and claims priority under 35 USC 119 from Japanese Patent Application No. 2022-143655 filed Sep. 9, 2022.

BACKGROUND

(i) Technical Field

The present disclosure relates to an information processing apparatus, an information processing system, a non-transitory computer readable medium, and a method for processing information.

(ii) Related Art

Japanese Patent No. 6536832 discloses a job execution system including an image forming apparatus, a computer, charge calculation means for calculating a charge on the basis of a job that employs the image forming apparatus, payment code notification means for notifying of a payment code issued by an online transaction service for the charge calculated by the charge calculation means, and job execution means for executing the job when the charge is paid through the online transaction service using the payment code notified of by the payment code notification means. When the job is executed, the image forming apparatus transmits an image forming apparatus identifier (ID), which is identification information regarding the image forming apparatus, and a job ID, which is identification information regarding the job, to the computer. Upon receiving the image forming apparatus ID and the job ID from the image forming apparatus, the computer transmits, to the online transaction service, a request for the payment code for the charge calculated by the charge calculation means. Upon receiving the payment code sent back from the online transaction service, the computer stores the payment code and the image forming apparatus ID and the job ID transmitted from the image forming apparatus while associating the code and the IDs with each other. When the computer receives the payment code sent back from the online transaction service, the payment code notification means notifies of the payment code. When the charge is paid through the online transaction service using the payment code notified of by the payment code notification means, the computer transmits, to the image forming apparatus whose image forming apparatus ID is associated with the payment code, a payment completion notification indicating completion of payment of the charge for the job whose job ID is associated with the payment code transmitted from the online transaction service along with a notification indicating the completion of the payment of the charge. When the image forming apparatus receives the payment completion notification from the computer, the job execution means executes the job whose job ID is indicated by the payment completion notification.

SUMMARY

There is a technique for receiving, when a transaction is performed at a store, a cashless transaction over a network, such as a quick response (QR) code (registered trademark) transaction or an electronic money transaction, instead of a transaction with cash. For example, a job execution system is disclosed that receives, through a cashless transaction, a transaction of a service provided by a multifunction apparatus, a multimedia terminal, or the like installed in a store and that executes a job.

The job execution system, however, needs to confirm a charge by setting in advance a job to be executed and then perform a cashless transaction for the charge when the job is executed. When jobs are successively executed, therefore, a transaction needs to be performed for each of the jobs.

Aspects of non-limiting embodiments of the present disclosure relate to an information processing apparatus, an information processing system, a non-transitory computer readable medium, and a method for processing information that do not require an operation for performing a transaction for each of jobs.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including processor configured to: receive an operation relating to payment of a deposit and obtain payment information, which is information regarding the payment of the deposit, from a transaction apparatus connected to the information processing apparatus over a network; receive the payment of the deposit corresponding to the payment information; add the deposit to a balance; receive execution of at least one job in consideration of the balance; and output, to the transaction apparatus, transaction information based on a cumulative charge, which is a sum of a charge for the at least one job.

BRIEF DESCRIPTION OF THE DRAWINGS

An exemplary embodiment of the present disclosure will be described in detail based on the following figures, wherein.

DETAILED DESCRIPTION

Figure 1:
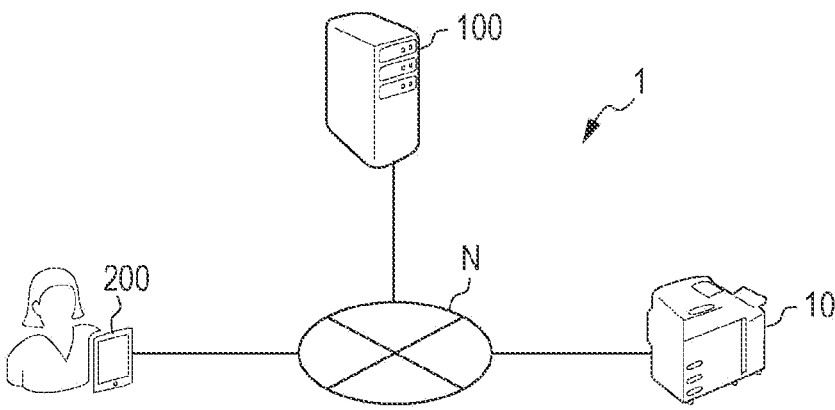
FIG. 1 is a schematic diagram illustrating an example of an information processing system according to the exemplary embodiment.

An exemplary embodiment for implementing the present disclosure will be described in detail hereinafter with reference to the drawings. FIG. 1 is a schematic diagram illustrating an example of the configuration of an information processing system 1 according to the present exemplary embodiment.

As illustrated in FIG. 1 as an example, the information processing system 1 includes an information processing apparatus 10 that executes jobs, a transaction server 100 that performs transactions in response to instructions from a user, and a terminal 200 owned by the user. The information processing apparatus 10, the transaction server 100, and the terminal 200 are connected to one another over a network N. Here, the transaction server 100 is an example of a transaction apparatus.

The information processing apparatus 10 is a multifunction apparatus that is installed in a store, a facility, or the like and that executes specified jobs, such as copying and printing, in response to operations performed by the user. The information processing apparatus 10 receives a notification of approval of a transaction from the transaction server 100, which will be described later, in response to an instruction from the user and receives a deposit from the user. The information processing apparatus 10 adds the received deposit to a balance stored therein and presents the resultant balance to the user. In the present exemplary embodiment, a "balance" refers to a difference between the sum of deposits paid by the user and the sum of charges (hereinafter referred to as a "cumulative charge") for received jobs. A mode in which the information processing apparatus 10 according to the present exemplary embodiment is a multifunction apparatus will be described. The information processing apparatus 10, however, is not limited to this. The information processing apparatus 10 may be a multimedia terminal, instead.

The transaction server 100 stores and manages electronic currency (hereinafter referred to as "electronic money") owned by the user and the information processing apparatus 10. The transaction server 100 stores information regarding payment of deposits (hereinafter referred to as "payment information") and performs transactions with electronic money in response to instructions from the user. For example, the transaction server 100 stores an information processing apparatus 10 that is a payee, a user who is a payer, and an amount as payment information and performs a transaction in response to a depositing instruction from the user.

In the present exemplary embodiment, a "transaction" refers to, for example, a process where an amount specified by the user is deducted from accounts, which are stored in the transaction server 100, for managing electronic money owned by the user and added to accounts for managing electronic money owned by the information processing apparatus 10. A transaction, however, is not limited to this. For example, an amount may be withdrawn from a bank account over a network, or when the terminal 200, which will be described later, stores electronic money, part or all of the electronic money stored in the terminal 200 may be sent.

The terminal 200 communicates with the transaction server 100 and causes the transaction server 100 to pay deposits to the information processing apparatus 10.

Figure 2:
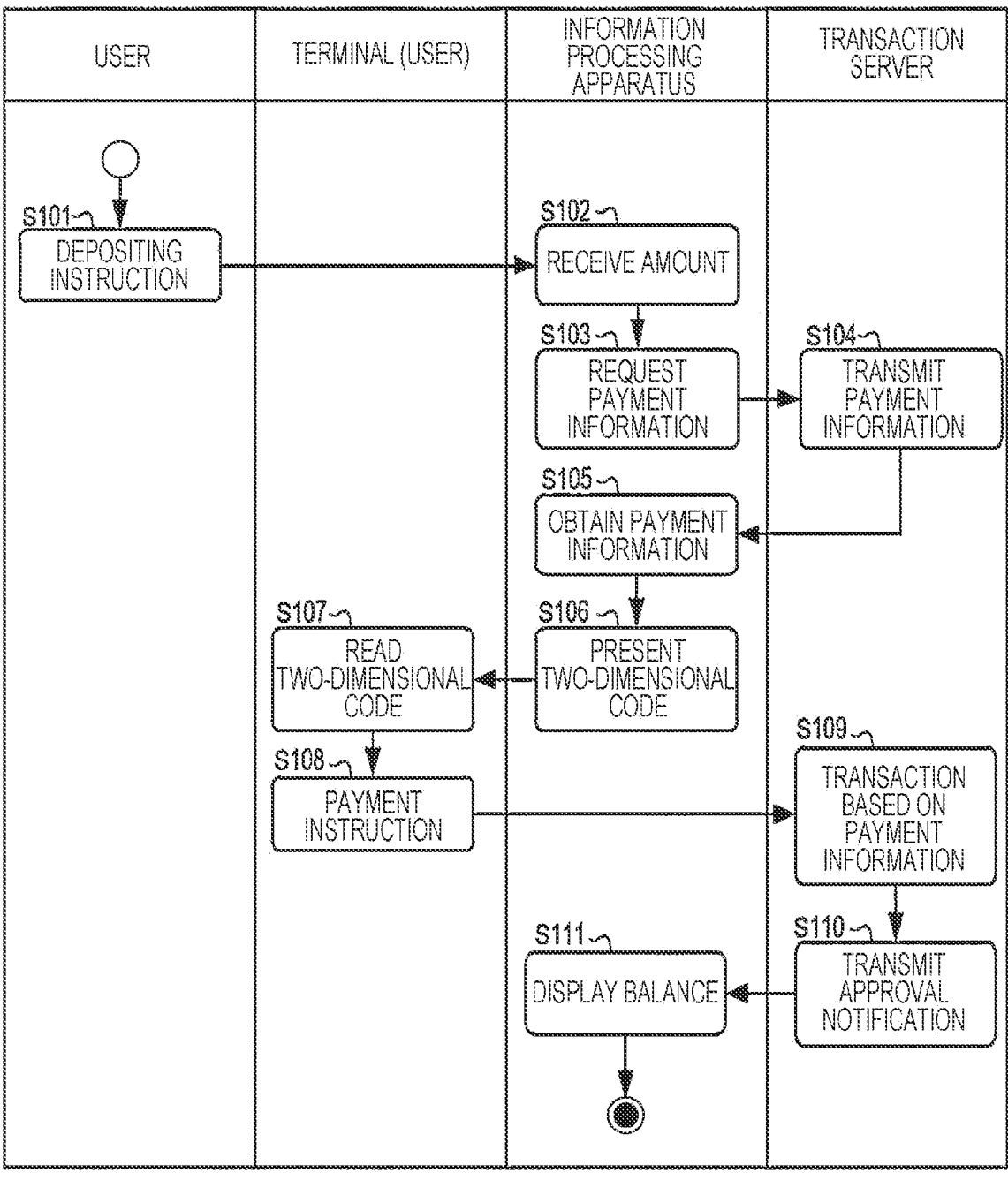
FIG. 2 is an activity diagram illustrating an example of a procedure that starts with a depositing instruction and that ends with addition of a deposit to a balance.

Next, a procedure that starts with a depositing instruction given from the terminal 200 and that ends with addition of a deposit to a balance managed by the information processing apparatus 10 will be described with reference to FIG. 2. FIG. 2 is an activity diagram illustrating an example of the procedure that starts with a depositing instruction and that ends with addition of a deposit to a balance.

As illustrated in FIG. 2 as an example, the user specifies an amount using the information processing apparatus 10 and gives a depositing instruction (step S101).

The information processing apparatus 10 receives the amount specified by the user and the depositing instruction (step S102) and transmits a request for payment information to the transaction server 100 along with the specified amount (step S103).

Upon receiving the request for payment information and the specified amount, the transaction server 100 sets and stores an ID, the amount, and a name of the information processing apparatus 10 as payment information and transmits the payment information to the information processing apparatus 10 (step S104). Here, the name of the information processing apparatus 10 is set as a payee in the payment information, and the specified amount is set as an amount in the payment information.

The information processing apparatus 10 obtains the payment information from the transaction server 100 (step S105), converts the obtained payment information into a two-dimensional code such as a QR code (registered trademark), and presents the two-dimensional code or the like to the user (step S106).

In response to an operation performed by the user, the terminal 200 reads the presented two-dimensional code (step S107) and transmits a payment instruction relating to the payment information to the transaction server 100 along with the read payment information (step S108).

Upon receiving the payment instruction along with the payment information, the transaction server 100 identifies the payment information using the ID of the received payment information, stores the name of the terminal 200 as a payer in the payment information, and performs a transaction based on the payment information (step S109). The transaction server 100 transmits a notification of approval of the transaction based on the payment information to the information processing apparatus 10 along with the payment information (step S110). Here, the transmission of the notification of approval of the transaction by the transaction server 100 based on the reading of the two-dimensional code by the terminal 200 is an example of an operation for adding a deposit.

Upon receiving the notification of approval of the transaction based on the payment information, the information processing apparatus 10 adds the amount in the payment information to a balance and displays the balance (step S111).

Next, the hardware configuration of the information processing apparatus 10 will be described with reference to FIG. 3.

Figure 3:
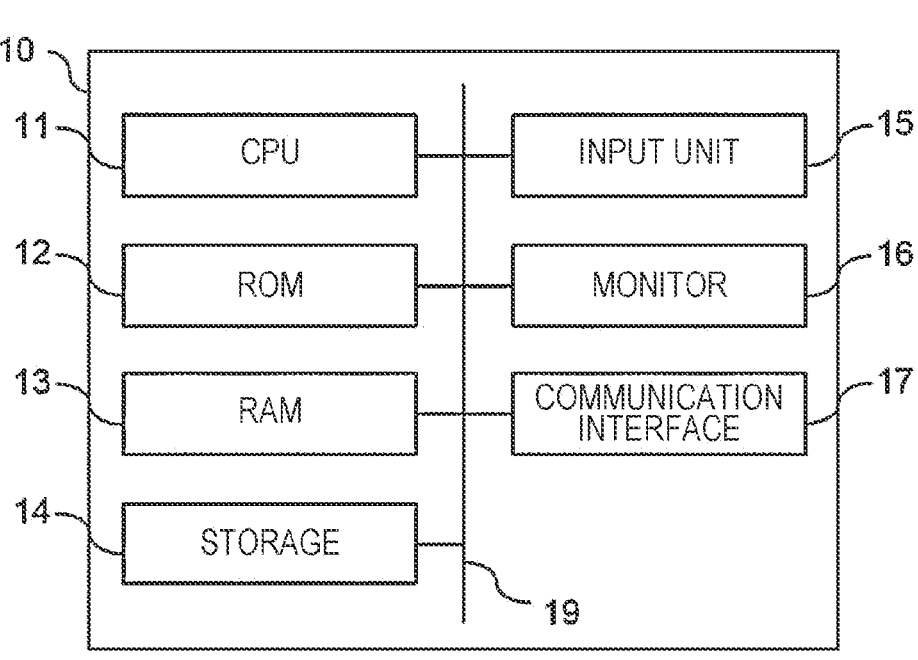
FIG. 3 is a block diagram illustrating an example of the hardware configuration of an information processing apparatus according to the exemplary embodiment.

As illustrated in FIG. 3 as an example, the information processing apparatus 10 according to the present exemplary embodiment includes a central processing unit (CPU) 11, a read-only memory (ROM) 12, a random-access memory (RAM) 13, a storage 14, an input unit 15, a monitor 16, and a communication interface 17. The CPU 11, the ROM 12, the RAM 13, the storage 14, the input unit 15, the monitor 16, and the communication interface 17 are connected to one another by a bus 19.

The CPU 11 monitors and controls the entirety of the information processing apparatus 10. The ROM 12 stores various programs, data, and the like. The RAM 13 is used as a work area when the various programs are executed. The CPU 11 loads one of the programs stored in the ROM 12 into the RAM 13 and executes the program to perform a process for receiving a deposit.

The storage 14 is, for example, a hard disk drive (HDD), a solid-state drive (SSD), a flash memory, or the like. The storage 14 may store various programs and the like.

The input unit 15 is a touch panel, buttons, or the like for allowing the user to input characters and give depositing instructions. The monitor 16 displays characters and images.

The communication interface 17 communicates data.

Figure 4:
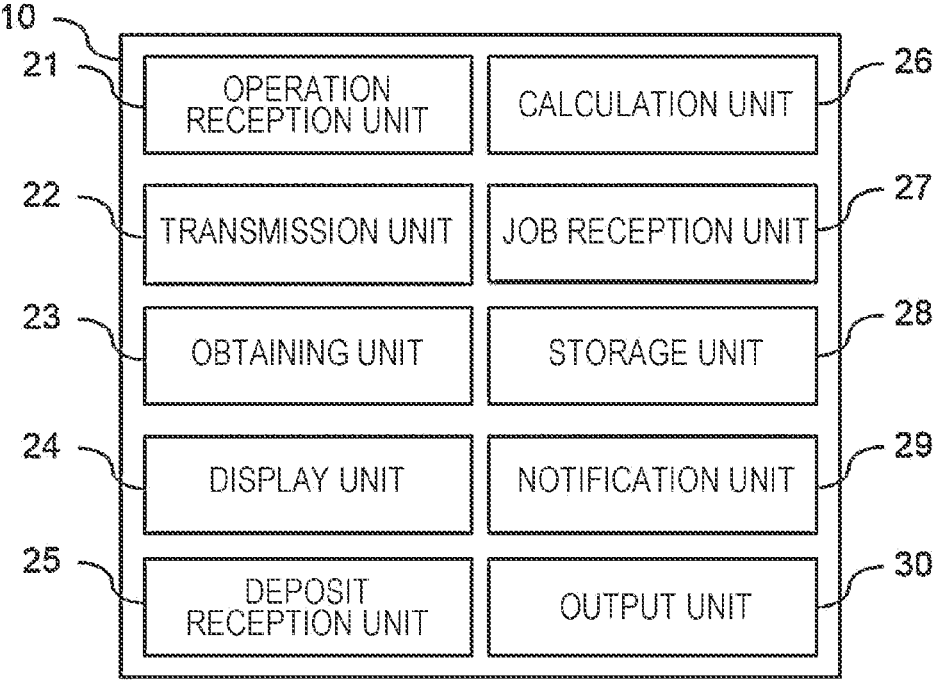
FIG. 4 is a block diagram illustrating an example of the functional configuration of the information processing apparatus according to the exemplary embodiment.

Next, the functional configuration of the information processing apparatus 10 will be described with reference to FIG. 4. FIG. 4 is a block diagram illustrating an example of the functional configuration of the information processing apparatus 10 according to the present exemplary embodiment.

As illustrated in FIG. 4 as an example, the information processing apparatus 10 includes an operation reception unit 21, a transmission unit 22, an obtaining unit 23, a display unit 24, a deposit reception unit 25, a calculation unit 26, a job reception unit 27, a storage unit 28, a notification unit 29, and an output unit 30. The CPU 11 executes a program for processing information to cause the information processing apparatus 10 to function as the operation reception unit 21, the transmission unit 22, the obtaining unit 23, the display unit 24, the deposit reception unit 25, the calculation unit 26, the job reception unit 27, the storage unit 28, the notification unit 29, and the output unit 30.

The operation reception unit 21 receives depositing instructions and repayment instructions as operations. The operation reception unit 21 displays a menu screen 40 illustrated in FIG. 5 as an example and receives operations relating to depositing instructions and repayment instructions.

The menu screen 40 includes, for example, a balance display field 41, a deposit button 42, a repay button 43, and job reception buttons 44. The menu screen 40 includes a copy button 44A, a print button 44B, and a scan button 44C as the job reception buttons 44. The balance display field 41 is a field where a balance, which is the amount of money deposited by the user, is displayed, the deposit button 42 is used to receive an instruction to add deposits, and the repay button 43 is used to return deposits. The copy button 44A is used to receive execution of jobs relating to copying, the print button 44B is used to receive execution of jobs relating to printing, and the scan button 44C is used to receive execution of jobs relating to scanning of a print. Since the deposit button 42 is provided, an operation for adding a deposit can be received between jobs to be executed.

Figure 6:
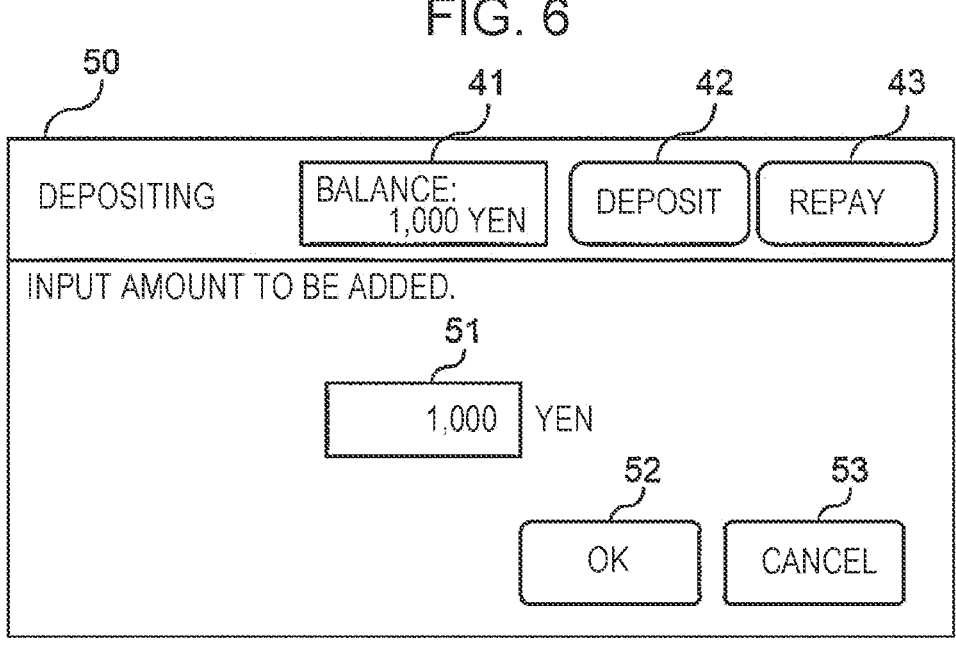
FIG. 6 is a diagram illustrating an example of a depositing screen according to the exemplary embodiment.

If the deposit button 42 is pressed, the operation reception unit 21 displays a depositing screen 50 illustrated in FIG. 6 as an example to allow the user to specify an amount to be deposited.

The depositing screen 50 includes, for example, the balance display field 41, the deposit button 42, the repay button 43, an amount input field 51, an OK button 52, and a cancel button 53. The amount input field 51 allows the user to specify an amount to be deposited, the OK button 52 is used to give a depositing instruction, and the cancel button 53 is used to cancel depositing.

When the OK button 52 is pressed, the transmission unit 22 illustrated in FIG. 3 transmits, as a depositing instruction, a request for payment information to the transaction server 100 along with a specified amount to be deposited.

After the request for payment information is transmitted, the obtaining unit 23 obtains, from the transaction server 100, an ID, a payee name, and the amount as payment information.

Figure 7:
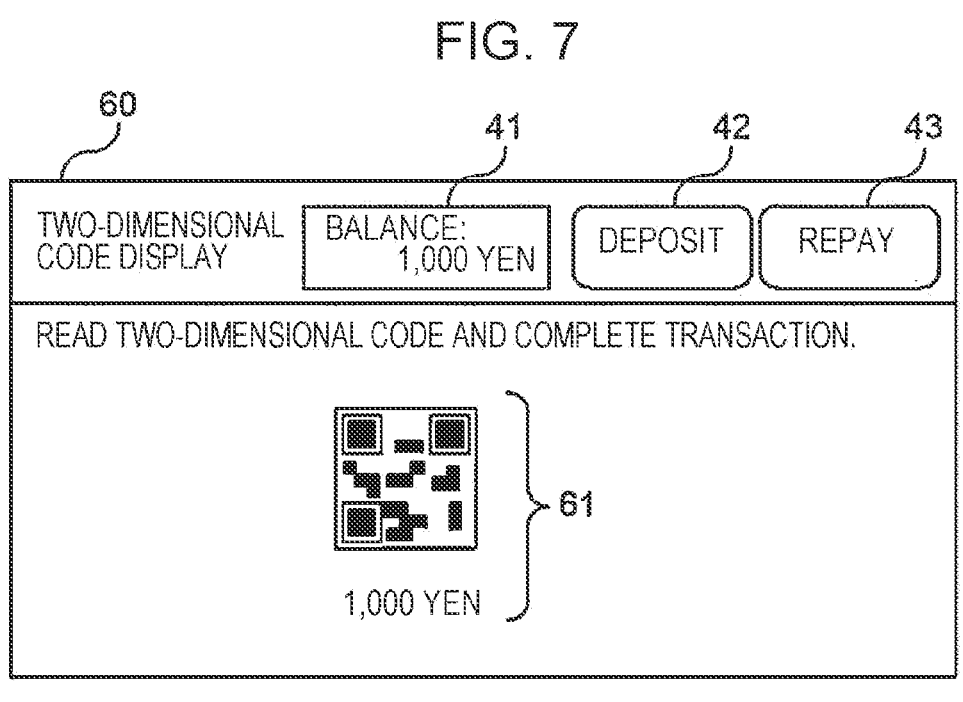
FIG. 7 is a diagram illustrating an example of a two-dimensional code display screen according to the exemplary embodiment.

The display unit 24 converts the obtained payment information into a two-dimensional code and displays the two-dimensional code on the monitor 16. As illustrated in FIG. 7 as an example, the display unit 24 displays the two-dimensional code by displaying a two-dimensional code display screen 60. The two-dimensional code display screen 60 includes the balance display field 41, the deposit button 42, the repay button 43, and a two-dimensional code display field 61. The two-dimensional code display field 61 is a field for displaying a two-dimensional code and an amount relating to the two-dimensional code.

After the terminal 200 reads a two-dimensional code and the transaction server 100 approves a transaction, the deposit reception unit 25 receives payment information and a notification of approval of the transaction from the transaction server 100 and then receives payment of the amount in the payment information.

The calculation unit 26 adds the received amount to the balance and displays the resultant balance in the balance display field 41 of the menu screen 40, the depositing screen 50, and the two-dimensional code display screen 60. The calculation unit 26 also deducts, from the balance, a charge for a job received from the user and displays the resultant balance in the balance display field 41.

Figure 5:
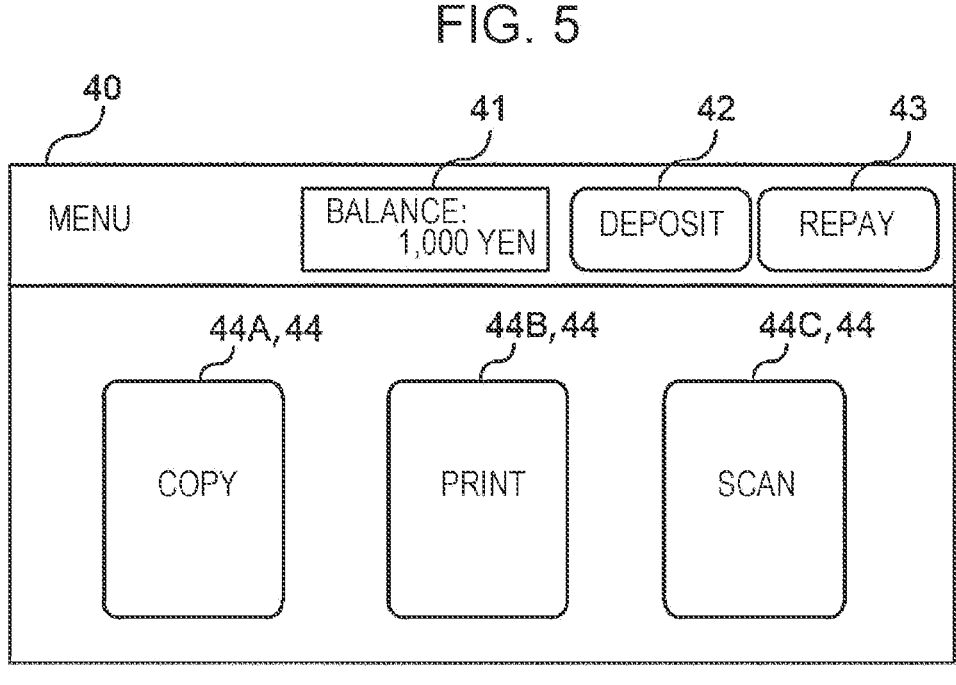
FIG. 5 is a diagram illustrating an example of a menu screen according to the exemplary embodiment.

When one of the job reception buttons 44 in the menu screen 40 illustrated in FIG. 5 is pressed, the job reception unit 27 receives an instruction to execute a job from the user. Here, the job reception unit 27 receives execution of a job in consideration of the balance. If receiving a job, the job reception unit 27 displays a charge for the job and the balance from which the charge for the job has been deducted.

The storage unit 28 stores a cumulative charge for jobs received by the job reception unit 27. The storage unit 28 also stores payment information obtained from the transaction server 100.

If a charge for a job received by the job reception unit 27 exceeds the balance, the notification unit 29 notifies the user that the balance is insufficient. Alternatively, if a charge for a job exceeds the balance, the notification unit 29 may display the depositing screen 50 illustrated in FIG. 6 and prompt the user to add a deposit to the balance.

The output unit 30 outputs transaction information regarding a job received from the user to the transaction server 100. Here, "transaction information" refers to IDs of payment information, the balance, and charges for received jobs.

Next, the hardware configuration of the transaction server 100 will be described with reference to FIG. 8.

Figure 8:
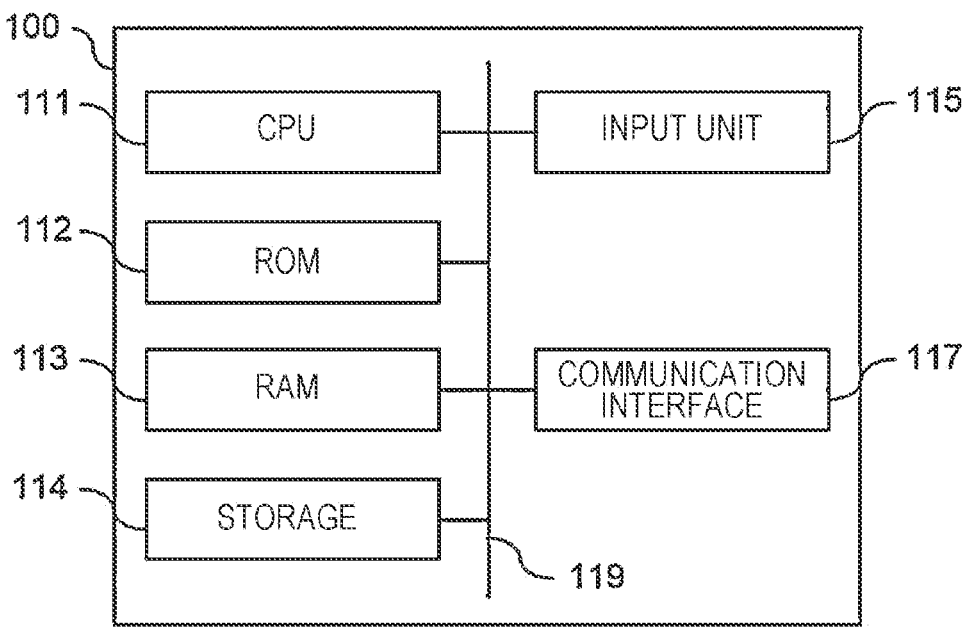
FIG. 8 is a block diagram illustrating an example of the hardware configuration of a transaction server according to the exemplary embodiment.

As illustrated in FIG. 8 as an example, the transaction server 100 according to the present exemplary embodiment includes a CPU 111, a ROM 112, a RAM 113, a storage 114, an input unit 115, and a communication interface 117. The CPU 111, the ROM 112, the RAM 113, the storage 114, the input unit 115, and the communication interface 117 are connected to one another by a bus 119.

The CPU 111 monitors and controls the entirety of the transaction server 100. The ROM 112 stores various programs, data, and the like. The RAM 113 is used as a work area when the various programs are executed. The CPU 111 loads one of the programs stored in the ROM 112 into the RAM 113 and executes the program to perform a transaction process based on payment information.

The storage 114 is, for example, an HDD, an SSD, a flash memory, or the like. The storage 114 may store various programs and the like.

The input unit 115 is a touch panel, buttons, or the like for allowing the user to input characters. The communication interface 117 communicates data.

Figures 9, 10:
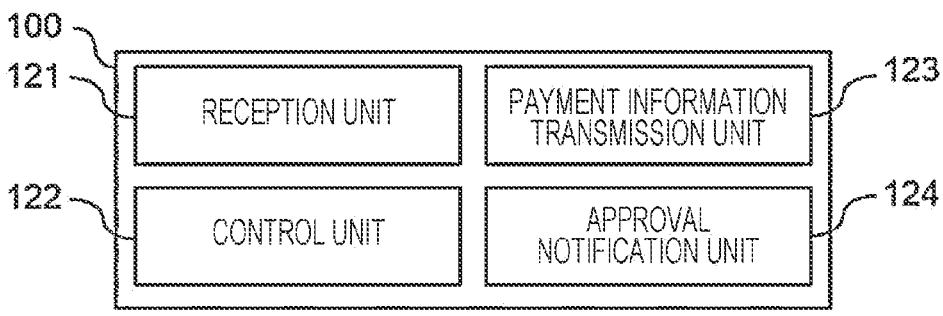
FIG. 9 is a block diagram illustrating an example of the functional configuration of the transaction server according to the exemplary embodiment.
FIG. 10 is a diagram illustrating an example of payment information according to the exemplary embodiment.

Next, the functional configuration of the transaction server 100 will be described with reference to FIG. 9. FIG. 9 is a block diagram illustrating an example of the functional configuration of the transaction server 100 according to the present exemplary embodiment.

As illustrated in FIG. 9 as an example, the transaction server 100 includes a reception unit 121, a control unit 122, a payment information transmission unit 123, and an approval notification unit 124. When the CPU 111 executes a transaction program, the transaction server 100 functions as the reception unit 121, the control unit 122, the payment information transmission unit 123, and the approval notification unit 124.

The reception unit 121 receives, from the information processing apparatus 10, a request for payment information and a repayment instruction. The reception unit 121 also receives a payment instruction from the terminal 200.

When the reception unit 121 receives a request for payment information, the control unit 122 sets and stores payment information. As illustrated in FIG. 10 as an example, payment information includes an ID, a payee name, a payer name, an amount, and a transaction status. An ID is used to identify an individual payment made by the user, a payee name is a name of a target (e.g., the information processing apparatus 10) to which a deposit is paid, and a payer name is a name of a user who pays a deposit. An amount is an amount of money specified by the user, and a transaction status is information indicating, for example, whether a deposit has been paid and whether a deposit has been repaid.

When the control unit 122 receives a request for payment information and an amount from the information processing apparatus 10, for example, the control unit 122 stores a name of the information processing apparatus 10 and the amount and sets an ID for the payment information. Here, the control unit 122 sets "depositing requested", which indicates that there has been a depositing instruction, as a transaction status. Because a user who pays a deposit is unknown at this point in time, a payer name is blank in the payment information.

When the control unit 122 receives a payment instruction and payment information from the terminal 200, the control unit 122 sets, using an ID of the received payment information, a payer name in the payment information indicating a user who pays a deposit and "provisional transaction", which indicates that the user has provisionally paid a deposit, as a transaction status in the payment information. Here, the control unit 122 performs a transaction based on the payment information.

When the control unit 122 receives a repayment instruction and transaction information from the information processing apparatus 10, the control unit 122 identifies stored payment information using IDs included in the received transaction information. The control unit 122 performs a transaction between charges for jobs included in the transaction information and amounts included in the payment information. Here, transaction statuses of the identified payment information are "provisional transaction". The control unit 122 performs a transaction between amounts in payment information whose transaction statuses are "provision depositing" and charges for jobs in order of depositing. If the sum of the amounts in the payment information exceeds a cumulative charge for the jobs, the control unit 122 repays a difference between the sum and the cumulative charge to the user.

It is assumed, for example, that there are payment information A whose amount "400 yen" was paid first and payment information B whose amount "400 yen" was paid later and that a cumulative charge for jobs is "500 yen". The control unit 122 obtains "100 yen", which is a difference between "400 yen", which is the amount in the payment information A paid first, and "500 yen", which is the cumulative charge for the jobs. The control unit 122 then obtains "300 yen", which is a difference between "400 yen", which is the amount in the payment information B paid later, and "100 yen", which is the obtained difference, and repays "300 yen" to the user to complete a transaction. In the present exemplary embodiment, a mode in which a transaction between charges for jobs and payment information is performed has been described. A mode for performing a transaction, however, is not limited to this. A transaction may be performed using a balance included in payment information, instead. More specifically, when a balance included in payment information exceeds 0, the balance may be repaid to the user.

When the control unit 122 receives transaction information from the information processing apparatus 10, the control unit 122 sets "transaction complete", which indicates that a transaction based on the payment information has been completed.

When the payment information transmission unit 123 receives a request for payment information from the information processing apparatus 10, the payment information transmission unit 123 transmits payment information to the information processing apparatus 10.

When the approval notification unit 124 receives a payment instruction from the terminal 200, the approval notification unit 124 transmits a notification of approval of a transaction and payment information to the information processing apparatus 10.

Figure 11:
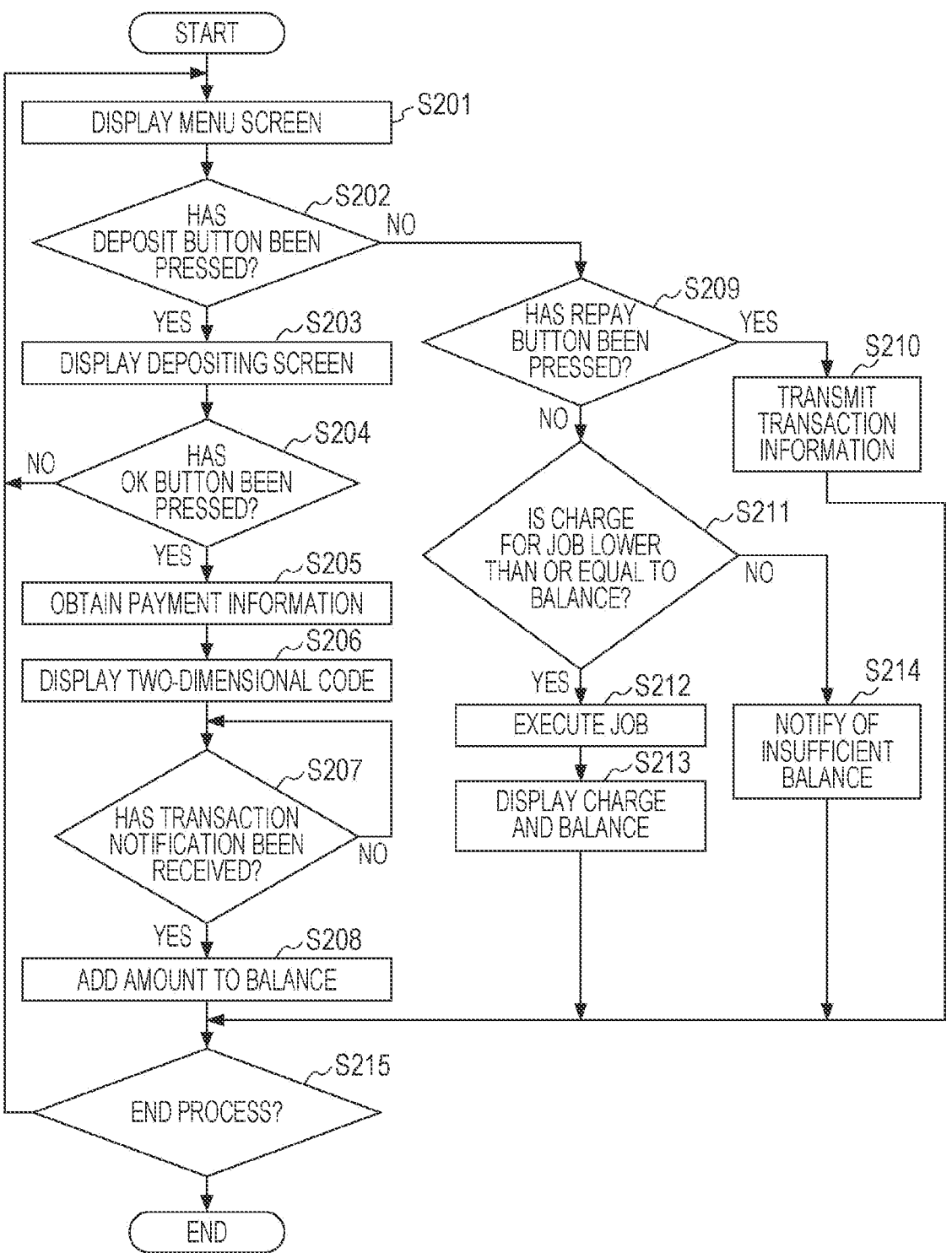
FIG. 11 is a flowchart illustrating an example of a procedure of information processing according to the exemplary embodiment.

Next, an operation performed by the information processing apparatus 10 according to the present exemplary embodiment will be described. FIG. 11 is a flowchart illustrating an example of a procedure of information processing according to the present exemplary embodiment. The CPU 11 reads the program for processing information from the ROM 12 or the storage 14 and executes the program to achieve the information processing illustrated in FIG. 11. The information processing illustrated in FIG. 11 is performed, for example, when an instruction to perform information processing is input.

In step S201, the CPU 11 displays the menu screen 40.

In step S202, the CPU 11 determines whether the deposit button 42 has been pressed. If the deposit button 42 is pressed (YES in step S202), the CPU 11 proceeds to step S203. If the deposit button 42 has not been pressed (NO in step S202), on the other hand, the CPU 11 proceeds to step S209.

In step S203, the CPU 11 displays the depositing screen 50.

In step S204, the CPU 11 determines whether an amount has been specified and the OK button 52 has been pressed. If the OK button 52 has been pressed (YES in step S204), the CPU 11 proceeds to step S205. If the OK button 52 has not been pressed (if the cancel button 53 has been pressed) (NO in step S204), the CPU 11 proceeds to step S201 and displays the menu screen 40.

In step S205, the CPU 11 transmits a request for payment information to the transaction server 100 along with the specified amount and obtains payment information from the transaction server 100.

In step S206, the CPU 11 converts the obtained payment information into a two-dimensional code and displays the two-dimensional code.

In step S207, the CPU 11 determines whether a notification of approval of a transaction has been received from the transaction server 100. If a notification of approval of a transaction has been received (YES in step S207), the CPU 11 proceeds to step S208. If a notification of approval of a transaction has not been received (NO in step S207), on the other hand, the CPU 11 waits until a notification of approval of a transaction is received.

In step S208, the CPU 11 adds the amount received along with the notification of approval of a transaction to a balance.

In step S209, the CPU 11 determines whether the repay button 43 has been pressed. If the repay button 43 has been pressed (YES in step S209), the CPU 11 proceeds to step S210. If the repay button 43 has not been pressed (if one of the job reception buttons 44 has been pressed) (NO in step S209), on the other hand, the CPU 11 proceeds to step S211.

In step S210, the CPU 11 transmits transaction information to the transaction server 100.

In step S211, the CPU 11 determines whether a charge for a received job is lower than or equal to the balance. If the charge for the job is lower than or equal to the balance (YES in step S211), the CPU 11 proceeds to step S212. If the charge for the job is not lower than or equal to the balance (if the charge for the job exceeds the balance) (NO in step S211), on the other hand, the CPU 11 proceeds to step S214.

In step S212, the CPU 11 executes the job received from the user.

In step S213, the CPU 11 calculates the balance after the charge for the received job is deducted and displays the charge for the job and the balance after the charge is deducted.

In step S214, the CPU 11 displays the depositing screen 50 and notifies the user that the balance is insufficient.

In step S215, the CPU 11 determines whether to end a process for receiving a deposit. If the process for receiving a deposit is to be ended (YES in step S215), the CPU 11 ends the process for receiving a deposit. If the process for receiving a deposit is not to be ended (NO in step S215), on the other hand, the CPU 11 proceeds to step S201 and displays the menu screen 40.

Figure 12:
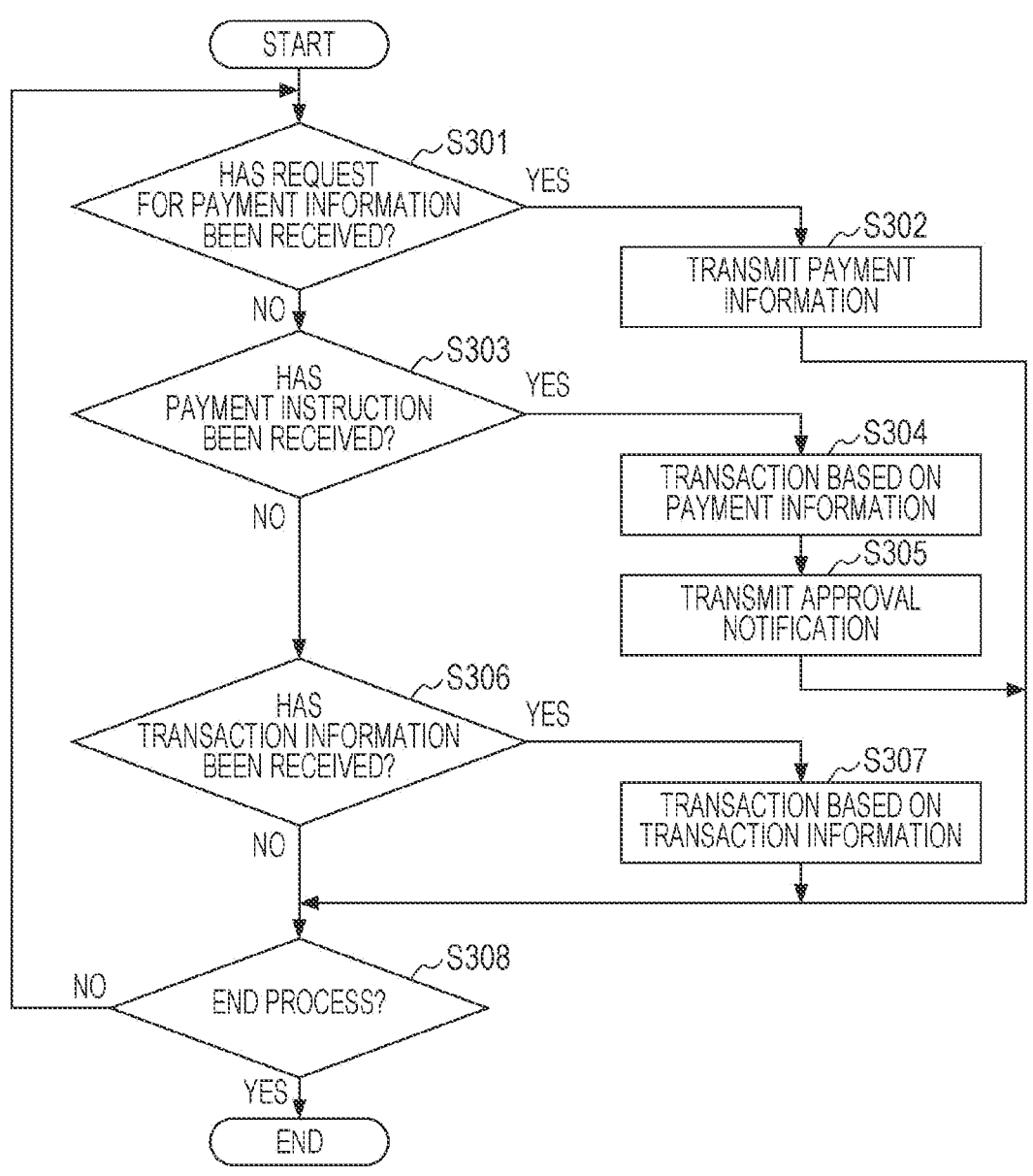
FIG. 12 is a flowchart illustrating an example of a procedure of a transaction process performed by the transaction server according to the exemplary embodiment.

Next, an operation performed by the transaction server 100 according to the present exemplary embodiment will be described with reference to FIG. 12. FIG. 12 is a flowchart illustrating an example of a procedure of a transaction process according to the present exemplary embodiment. The CPU 111 reads a transaction process program from the ROM 112 or the storage 114 and executes the transaction process program to achieve a transaction process illustrated in FIG. 12. The transaction process illustrated in FIG. 12 is performed, for example, when an instruction to perform a transaction process is input.

In step S301, the CPU 111 determines whether a request for payment information has been received from the information processing apparatus 10. If a request for payment information has been received (YES in step S301), the CPU 111 proceeds to step S302. If a request for payment information has not been received (NO in step S301), on the other hand, the CPU 11 proceeds to step S303.

In step S302, the CPU 111 transmits payment information to the information processing apparatus 10. Here, the CPU 111 sets "depositing requested" as a transaction status in the payment information.

In step S303, the CPU 111 determines whether a payment instruction has been received from the terminal 200. If a payment instruction has been received (YES in step S303), the CPU 111 proceeds to step S304. If a payment instruction has not been received (NO in step S303), on the other hand, the CPU 111 proceeds to step S306.

In step S304, the CPU 111 deducts an amount from the accounts for managing electronic money owned by the user on the basis of the payment information and adds the amount to the accounts for managing electronic money owned by the information processing apparatus 10 to perform a transaction. Here, the CPU 111 sets "provisional transaction" as the transaction status.

In step S305, the CPU 111 transmits a notification of approval of a transaction to the information processing apparatus 10.

In step S306, the CPU 111 determines whether transaction information has been received from the information processing apparatus 10. If transaction information has been received (YES in step S306), the CPU 111 proceeds to step S307. If transaction information has not been received (No in step S306), on the other hand, the CPU 111 proceeds to step S308.

In step S307, the CPU 111 performs a transaction between amounts in payment information and charges for jobs on the basis of the transaction information and sets "transaction complete" as the transaction status. If the sum of the amounts in the payment information exceeds a cumulative charge for the jobs, the CPU 111 deducts a difference between the sum and the cumulative charge from the accounts for managing electronic money owned by the information processing apparatus 10 and adds the difference to the accounts for managing electronic money owned by the user to repay the amount to the user.

In step S308, the CPU 111 determines whether to end the transaction process. If the transaction process is to be ended (YES in step S308), the CPU 111 ends the transaction process. If the transaction process is not to be ended (No in step S308), on the other hand, the CPU 111 proceeds to step S301 and determines whether a request for payment information has been received.

As described above, according to the present exemplary embodiment, a transaction need not be performed for each of jobs.

A mode in which the terminal 200 according to the present exemplary embodiment reads a two-dimensional code has been described. A mode used, however, is not limited this. The terminal 200 may display a two-dimensional code, instead. For example, the information processing apparatus 10 may, after receiving an instruction to add a deposit, receive payment information from the transaction server 100 and read a payment instruction and a two-dimensional code indicating an amount displayed on the terminal 200, instead. The information processing apparatus 10 may transmit the read payment instruction and the amount to the transaction server 100. Here, an operation for causing the information processing apparatus 10 to read a two-dimensional code displayed on the terminal 200 is another example of the operation for adding a deposit.

A mode in which the transaction server 100 according to the present exemplary embodiment receives a payment instruction from one terminal has been described. A mode used, however, is not limited to this. The transaction server 100 may receive payment instructions from plural terminals, instead. When the transaction server 100 performs a provisional transaction with an amount relating to a deposit and then performs another provisional transaction with an amount relating to another deposit, for example, the transaction server 100 may receive a payment instruction from a terminal 200 different from one relating to the first deposit. When payment instructions are received from plural terminals 200, a deposit can be paid using a terminal 200 even if electronic money associated with another terminal 200 is insufficient.

In addition, a mode in which payment information received by the information processing apparatus 10 is converted into a two-dimensional code has been described in the above exemplary embodiment. A mode used, however, is not limited. The transaction server 100 may convert payment information, instead.

Although the present disclosure has been described using an exemplary embodiment, the present disclosure is not limited to a scope of the exemplary embodiment. The exemplary embodiment may be modified or improved in various ways without deviating from the spirit of the present disclosure, and the technical scope of the present disclosure also includes such modifications and improvements.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, although a mode in which the program for processing information is installed in a storage has been described in the present exemplary embodiment, a mode used is not limited to this. The program for processing information according to the present exemplary embodiment may be stored in a computer readable medium and provided, instead. For example, the program for processing information in the present disclosure may be stored in an optical disc such as a compact disc read-only memory (CD-ROM) or a digital versatile disc read-only memory (DVD-ROM) and provided, instead. The program for processing information in the present disclosure may be stored in a semiconductor memory such as a universal serial bus (USB) memory or a memory card and provided, instead. The program for processing information according to the present exemplary embodiment may be obtained from an external apparatus over a communication network connected to a communication interface, instead.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus comprising:

a processor configured to:

receive an operation relating to payment of a deposit and obtain payment information, which is information regarding the payment of the deposit, from a transaction apparatus connected to the information processing apparatus over a network;

receive the payment of the deposit corresponding to the payment information;

add the deposit to a balance;

receive execution of at least one job in consideration of the balance; and output, to the transaction apparatus, transaction information based on a cumulative charge, which is a sum of a charge for the at least one job.

(((2)))

The information processing apparatus according to (((1))), wherein the processor is configured to receive an operation for adding another deposit.

(((3)))

The information processing apparatus according to (((2))), wherein the processor is configured to receive, in a case where an instruction to add another deposit is received from a user, the operation for adding another deposit.

(((4)))

The information processing apparatus according to any one of (((1))) to (((3))), wherein the processor is configured to display the balance in a case where the execution of the at least one job is received.

(((5)))

The information processing apparatus according to (((4))), wherein the processor is configured to display, in case where the execution of the at least one job is received, the charge for the job and the balance.

(((6)))

The information processing apparatus according to any one of (((1))) to (((5))), wherein the processor is configured to receive specification of an amount of the deposit as the operation.

(((7)))

The information processing apparatus according to (((6))), wherein the payment information is a code image indicating information for identifying a transaction performed by the transaction apparatus corresponding to the specified amount, and wherein the processor is configured to receive the deposit by reading the payment information or making a user read the payment information using another apparatus.

(((8)))

The information processing apparatus according to any one of (((1))) to (((7))), wherein the processor is configured to output, as the transaction information, at least a balance that is a difference between the cumulative charge and a sum of deposits or the charge for the at least one job.

(((9)))

An information processing system comprising:

the information processing apparatus according to any one of (((1))) to (((8)));

a terminal that transmits an instruction to pay a deposit; and a transaction apparatus that receives the instruction and that performs a transaction with the deposit.

(((10)))

The information processing system according to (((9))), wherein the transaction apparatus repays the balance on a basis of the transaction apparatus.

(((11)))

The information processing system according to (((9))) or (((10))), wherein, in a case where a plurality of payments occur as a result of a plurality of instructions, the transaction apparatus performs transactions in order of reception of the plurality of instructions.

(((12)))

The information processing system according to (((11))), wherein the transaction apparatus is capable of receiving the plurality of instructions from a plurality of terminals.

(((13)))

A program causing a computer to execute a process for processing information, the process comprising:

receiving an operation necessary for payment of a deposit and obtaining payment information, which is information regarding the payment of the deposit, from a transaction apparatus connected to the computer over a network;

receiving the payment of the deposit corresponding to the payment information;

adding the deposit to a balance;

receiving execution of at least one job in consideration of the balance; and outputting, to the transaction apparatus, transaction information based on a cumulative charge, which is a sum of a charge for the at least one job.

What is claimed is:

1. An information processing apparatus comprising:

a processor configured to:

receive an operation relating to payment of a deposit and obtain payment information, which is information regarding the payment of the deposit, from a transaction apparatus connected to the information processing apparatus over a network;

receive the payment of the deposit corresponding to the payment information;

add the deposit to a balance;

receive execution of at least one job in consideration of the balance; and output, to the transaction apparatus, transaction information based on a cumulative charge, which is a sum of a charge for the at least one job, wherein the at least one job comprises at least one of a copying operation, a printing operation, or a scanning operation performed by the information processing apparatus that is a multifunction device, the cumulative charge represents a sum of charges for a plurality of document processing operations executed against the balance, the payment information is converted into a code image and displayed to a user, the deposit is received when a terminal of the user reads the code image and transmits a payment instruction to the transaction apparatus, the transaction apparatus performs a provisional transaction with the deposit upon receiving the payment instruction, and in response to a repayment instruction from the user, the information processing apparatus outputs the transaction information to the transaction apparatus, and the transaction apparatus finalizes the provisional transaction based on the transaction information.

2. The information processing apparatus according to claim 1, wherein the processor is configured to receive an operation for adding another deposit.

3. The information processing apparatus according to claim 2, wherein the processor is configured to receive, in a case where an instruction to add another deposit is received from a user, the operation for adding another deposit.

4. The information processing apparatus according to claim 1, wherein the processor is configured to display the balance in a case where the execution of the at least one job is received.

5. The information processing apparatus according to claim 4, wherein the processor is configured to display, in case where the execution of the at least one job is received, the charge for the job and the balance.

6. The information processing apparatus according to claim 1, wherein the processor is configured to output, as the transaction information, at least a balance that is a difference between the cumulative charge and a sum of deposits or the charge for the at least one job.

7. An information processing system comprising:

the information processing apparatus according to claim 1;

a terminal that transmits an instruction to pay a deposit; and a transaction apparatus that receives the instruction and that performs a transaction with the deposit.

8. An information processing system comprising:

the information processing apparatus according to claim 2;

a terminal that transmits an instruction to pay a deposit; and a transaction apparatus that receives the instruction and that performs a transaction with the deposit.

9. An information processing system comprising:

the information processing apparatus according to claim 3;

a terminal that transmits an instruction to pay a deposit; and a transaction apparatus that receives the instruction and that performs a transaction with the deposit.

10. An information processing system comprising:

the information processing apparatus according to claim 4;

a terminal that transmits an instruction to pay a deposit; and a transaction apparatus that receives the instruction and that performs a transaction with the deposit.

11. An information processing system comprising:

the information processing apparatus according to claim 5;

a terminal that transmits an instruction to pay a deposit; and a transaction apparatus that receives the instruction and that performs a transaction with the deposit.

12. The information processing system according to claim 7, wherein the transaction apparatus repays the balance on a basis of the transaction apparatus.

13. The information processing system according to claim 7, wherein, in a case where a plurality of payments occur as a result of a plurality of instructions, the transaction apparatus performs transactions in order of reception of the plurality of instructions.

14. The information processing system according to claim 13, wherein the transaction apparatus is capable of receiving the plurality of instructions from a plurality of terminals.

15. A non-transitory computer readable medium storing a program causing a computer to execute a process for processing information, the process comprising:

receiving an operation necessary for payment of a deposit and obtaining payment information, which is information regarding the payment of the deposit, from a transaction apparatus connected to the computer over a network;

receiving the payment of the deposit corresponding to the payment information;

adding the deposit to a balance;

receiving execution of at least one job in consideration of the balance; and outputting, to the transaction apparatus, transaction information based on a cumulative charge, which is a sum of a charge for the at least one job, wherein the at least one job comprises at least one of a copying operation, a printing operation, or a scanning operation performed by a multifunction device, the cumulative charge represents a sum of charges for a plurality of document processing operations executed against the balance, the payment information is converted into a code image and displayed to a user, the deposit is received when a terminal of the user reads the code image and transmits a payment instruction to the transaction apparatus, the transaction apparatus performs a provisional transaction with the deposit upon receiving the payment instruction, and in response to a repayment instruction from the user, the computer outputs the transaction information to the transaction apparatus, and the transaction apparatus finalizes the provisional transaction based on the transaction information.

16. A method for processing information, the method comprising:

receiving an operation necessary for payment of a deposit and obtaining payment information, which is information regarding the payment of the deposit, from a transaction apparatus connected over a network;

receiving the payment of the deposit corresponding to the payment information;

adding the deposit to a balance;

receiving execution of at least one job in consideration of the balance; and outputting, to the transaction apparatus, transaction information based on a cumulative charge, which is a sum of a charge for the at least one job, wherein the at least one job comprises at least one of a copying operation, a printing operation, or a scanning operation performed by a multifunction device, the cumulative charge represents a sum of charges for a plurality of document processing operations executed against the balance, the payment information is converted into a code image and displayed to a user, the deposit is received when a terminal of the user reads the code image and transmits a payment instruction to the transaction apparatus, the transaction apparatus performs a provisional transaction with the deposit upon receiving the payment instruction, and in response to a repayment instruction from the user, the transaction information is output to the transaction apparatus, and the transaction apparatus finalizes the provisional transaction based on the transaction information.

* * * * *